(12) United States Patent
Nishioka

(10) Patent No.: US 9,374,482 B2
(45) Date of Patent: Jun. 21, 2016

(54) IMAGE PROCESSING APPARATUS, METHOD FOR DISPLAYING PREVIEW IMAGE, AND RECORDING MEDIUM

(71) Applicant: KONICA MINOLTA, INC., Chiyoda-ku (JP)

(72) Inventor: Daiki Nishioka, Hino (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/255,514

(22) Filed: Apr. 17, 2014

(65) Prior Publication Data
US 2014/0313533 A1 Oct. 23, 2014

(30) Foreign Application Priority Data

Apr. 17, 2013 (JP) .................... 2013-086434

(51) Int. Cl.
*G06K 15/02* (2006.01)
*H04N 1/00* (2006.01)

(52) U.S. Cl.
CPC ....... *H04N 1/00411* (2013.01); *H04N 1/00381* (2013.01); *H04N 1/00458* (2013.01)

(58) Field of Classification Search
None
See application file for complete search history.

(56) References Cited

U.S. PATENT DOCUMENTS

| | | | | |
|---|---|---|---|---|
| 6,388,778 B1* | 5/2002 | Ko-Chien | ............ | H04N 1/047 358/474 |
| 6,999,198 B1* | 2/2006 | Nakagiri | ............ | B42C 19/00 357/1.13 |
| 7,656,548 B2* | 2/2010 | Hagiwara | ............ | G06K 15/02 358/1.15 |
| 7,746,487 B2* | 6/2010 | Tsue | ............ | H04N 1/3875 358/1.13 |
| 7,880,919 B2* | 2/2011 | Tomita | ............ | G06T 11/60 358/1.1 |
| 8,279,319 B2* | 10/2012 | Date | ............ | G06F 17/30265 348/207.1 |
| 8,543,946 B2* | 9/2013 | Kethireddy | ............ | G06F 3/0481 345/157 |
| 9,076,085 B2* | 7/2015 | Yamada | ............ | G06K 15/005 |
| 2003/0133159 A1* | 7/2003 | Grosso | ............ | H04N 1/00132 358/1.18 |
| 2003/0197894 A1* | 10/2003 | Miyamoto | ............ | G06K 15/00 358/1.18 |
| 2004/0196502 A1* | 10/2004 | Mikawa | ............ | H04N 1/00132 358/1.15 |
| 2004/0239955 A1* | 12/2004 | Uchida | ............ | G06F 3/1205 358/1.1 |
| 2005/0002061 A1* | 1/2005 | Uchida | ............ | H04N 1/00222 358/1.18 |

(Continued)

FOREIGN PATENT DOCUMENTS

JP 2010020608 A 1/2010
JP 2011008768 A 1/2011

(Continued)

OTHER PUBLICATIONS

Japanese Office Action mailed Feb. 24, 2015 in corresponding Japanese Application No. 2013-086434, with full English Translation (5 pages).

*Primary Examiner* — Ted Barnes
(74) *Attorney, Agent, or Firm* — Buchanan Ingersoll & Rooney PC

(57) ABSTRACT

When an input unit receives a predetermined operation on a preview image during execution of a real-time preview, an image processing apparatus stores information that specifies the preview image for which the predetermined operation has been received, in a specific information storage unit. The image processing apparatus executes a first preview display of displaying a preview image for which the predetermined operation has been received or a preview image for which the predetermined operation has not been received among preview images of a job after completion of the real-time preview, based on the information stored in the specific information storage unit.

14 Claims, 18 Drawing Sheets

(56) References Cited

U.S. PATENT DOCUMENTS

| | | | | |
|---|---|---|---|---|
| 2005/0128518 A1* | 6/2005 | Tsue | H04N 1/00196 | 358/1.15 |
| 2005/0134947 A1* | 6/2005 | Tsue | G06T 11/60 | 358/537 |
| 2005/0237573 A1* | 10/2005 | Tomita | G06T 11/60 | 358/1.18 |
| 2005/0248811 A1* | 11/2005 | Nakagiri | G06F 3/1208 | 358/1.18 |
| 2006/0072174 A1* | 4/2006 | Koike | H04N 1/3875 | 358/537 |
| 2006/0112080 A1* | 5/2006 | Chen | G11B 27/031 | |
| 2006/0224559 A1* | 10/2006 | Abiko | H04N 1/32609 | |
| 2007/0061723 A1* | 3/2007 | Ohga | G06F 9/4443 | 715/705 |
| 2007/0070442 A1* | 3/2007 | Ohkubo | H04N 1/00442 | 358/451 |
| 2007/0139743 A1* | 6/2007 | Namizuka | H04N 1/0035 | 358/537 |
| 2007/0146833 A1* | 6/2007 | Satomi | G11B 27/034 | 358/537 |
| 2007/0153331 A1* | 7/2007 | Ueda | H04N 1/00132 | 358/1.18 |
| 2008/0030818 A1* | 2/2008 | Nagahara | H04N 1/3873 | 358/537 |
| 2008/0239329 A1* | 10/2008 | Kitada | H04N 1/00244 | 358/1.1 |
| 2009/0091770 A1* | 4/2009 | Kano | H04N 1/00132 | 358/1.1 |
| 2010/0188679 A1* | 7/2010 | Nakagawa | H04N 1/0035 | 358/1.12 |
| 2010/0333044 A1* | 12/2010 | Kethireddy | G06F 3/0481 | 715/863 |
| 2011/0099471 A1* | 4/2011 | Manijak | G06Q 10/06 | 715/274 |
| 2011/0122435 A1* | 5/2011 | Nishiyama | H04N 1/00222 | 358/1.15 |
| 2011/0228329 A1* | 9/2011 | Suzuki | G03G 15/6541 | 358/1.15 |
| 2011/0246947 A1* | 10/2011 | Hirohata | H04N 1/0035 | 715/838 |
| 2012/0099130 A1* | 4/2012 | Tohki | G03G 15/502 | 358/1.13 |
| 2012/0162678 A1* | 6/2012 | Kato | G03G 15/502 | 358/1.12 |
| 2012/0268771 A1* | 10/2012 | Kruizinga | H04N 1/00029 | 358/1.14 |
| 2013/0163049 A1* | 6/2013 | Kirihata | G06K 15/02 | 358/1.15 |
| 2013/0182285 A1* | 7/2013 | Matsuhara | H04N 1/00458 | 358/1.15 |
| 2013/0201523 A1* | 8/2013 | Oka | G06F 3/1292 | 358/1.15 |
| 2013/0215476 A1* | 8/2013 | Hashimoto | H04N 1/40062 | 358/448 |
| 2014/0143727 A1* | 5/2014 | Krikke | G06F 3/04842 | 715/835 |
| 2015/0156247 A1* | 6/2015 | Hensel | H04L 67/06 | 709/219 |

FOREIGN PATENT DOCUMENTS

| | | |
|---|---|---|
| JP | 2011-197079 A | 10/2011 |
| JP | 2011217081 | 10/2011 |
| JP | 2012-079093 A | 4/2012 |
| JP | 2013005154 A | 1/2013 |

* cited by examiner

IMAGE PROCESSING APPARATUS, METHOD FOR DISPLAYING PREVIEW IMAGE, AND RECORDING MEDIUM

This application is based on Japanese Patent Application No. 2013-086434 filed with the Japan Patent Office on Apr. 17, 2013, the entire content of which is hereby incorporated by reference.

BACKGROUND OF THE INVENTION

1. Field of the Invention

The present disclosure relates to an image processing apparatus, and particularly to an image processing apparatus which displays a preview image of input image information.

2. Description of the Related Art

An image processing apparatus, such as MFP (Multi-Functional Peripheral) having a scanner function, facsimile function, copy function, printer function, data communication function, and server function, a facsimile machine, a copying machine, and a printer device, for example, has a conventionally-known function of reading a document to obtain image data thereof and, in conjunction therewith, providing a preview display of a finished image. Such a function is called a "real-time preview function." Such a preview display is called a "real-time preview."

As for an image processing apparatus having the real-time preview function, Japanese Laid-Open Patent Publication No. 2012-079093, for example, discloses a technique for automatically changing the time for preview display in a real-time preview. Japanese Laid-Open Patent Publication No. 2011-197079 discloses a technique for setting the details of postprocessing by making an input by a gesture on a preview display at a real-time preview.

SUMMARY OF THE INVENTION

According to the technique disclosed in Japanese Laid-Open Patent Publication No. 2011-197079, however, a gesture for setting the details of postprocessing needs to be input during a period in which an image that is the target of setting is displayed in the real-time preview. For this reason, setting the details of postprocessing during the real-time preview may become difficult. It should be noted that, if the time period during which each image is displayed in the real-time preview is simply set to be longer, the real-time preview may require longer time, and the advantage of displaying in real time may be impaired.

The present disclosure was worked out in view of such actual circumstances, and has an object to enable a real-time preview of an image processing apparatus to be used for setting the details of postprocessing on a preview image without impairing the advantage of the real-time preview.

According to an aspect, an image processing apparatus is provided. The image processing apparatus includes an image reader configured to read an image, a preview image generator configured to, based on image information input with the image reader, generate a preview image of the image information, a real-time preview controller configured to execute a real-time preview for making a preview display of the preview image of all pages of a job from a first page on a job basis when image information is input with the image reader, an input unit configured to receive input of information, a specific information storage unit configured to, when the input unit receives a predetermined operation on the preview image during execution of the real-time preview, store information that specifies the preview image for which the predetermined operation has been received, and a first preview controller configured to execute a first preview display of displaying only one of the preview image for which the predetermined operation has been received and the preview image for which the predetermined operation has not been received among preview images of the job after completion of the real-time preview, based on the information stored in the specific information storage unit.

Preferably, the image processing apparatus further includes a second preview controller configured to execute a second preview display of displaying the preview image for which the predetermined operation has been received and the preview image for which the predetermined operation has not been received among preview images of the job in manners different from each other after completion of the real-time preview, based on the information stored in the specific information storage unit.

Preferably, the input unit receives, as the predetermined operation, at least one of instructions including deleting, rotating, scaling, and grouping on the image information. When the preview image for which the predetermined operation has been received is displayed, at least one of the first preview controller and the second preview controller displays the preview image for which the predetermined operation has been received in a manner corresponding to the predetermined operation input to the input unit.

Preferably, the image processing apparatus further includes a gesture information storage unit configured to store a gesture made on the input unit in association with a type of image processing. The input unit receives input of a gesture as the predetermined operation for each the preview image. For the preview image for which the gesture has been input to the input unit, the specific information storage unit stores the type of image processing corresponding to the gesture input to the input unit, in association with the preview image. When the preview image for which the predetermined operation has been received is displayed, at least one of the first preview controller and the second preview controller displays the preview image for which the predetermined operation has been received in a manner corresponding to the type of image processing stored in association with the preview image.

Preferably, the gesture input to the input unit includes at least one of instructions including a single touch for selecting the preview image, a flick operation for deleting image information corresponding to the preview image, a pinch-in/pinch-out operation for scaling up/down image information corresponding to the preview image, a multi-touch operation for grouping by the number of touches, and an operation of inputting a semicircular line for rotating image information.

Preferably, the image processing apparatus further includes a preview controller configured to select a display to be executed between the first preview display and the second preview display in accordance with the type of the predetermined operation input to the input unit.

Preferably, the preview image generator executes image processing on the preview image for display in the manner corresponding to the predetermined operation, in parallel to execution of the real-time preview by the real-time preview controller.

Preferably, the input unit receives input of an instruction for switching display between the first preview display and the second preview display.

According to another aspect, a method for an image processing apparatus to display a preview image of image information input by an image reader reading an image based on input of information to an input unit executed by a computer of the image processing apparatus is provided. The method includes reading an image, based on image information input by the step of reading, generating a preview image of the image information, when the image information is input, executing a real-time preview for making a preview display of the preview image of all pages of a job from a first page on a job basis, when the input unit receives a predetermined operation on the preview image during execution of the real-time preview, storing information that specifies the preview image for which the predetermined operation has been received, and executing a first preview display of displaying only one of the preview image for which the predetermined operation has been received and the preview image for which the predetermined operation has not been received among preview images of the job after completion of the real-time preview, based on the information that specifies the preview image for which the predetermined operation has been received.

According to still another aspect, a recording medium having recorded non-transitorily thereon a computer-readable program for causing a computer to execute the above-described method for a preview image to be displayed is provided.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
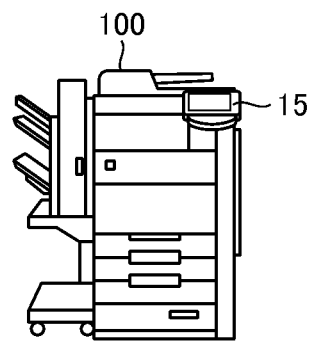
FIG. 1 is a diagram showing a specific example appearance of an embodiment of an image processing apparatus.

Referring to the drawings, an example embodiment of an image processing apparatus will be described below. In the following description, the same symbols are given to parts having the same function and effect, and redundant descriptions thereof will not be repeated.

<Appearance of Image Processing Apparatus>

FIG. 1 is a diagram showing a specific example appearance of an embodiment of an image processing apparatus. As shown in FIG. 1, MFP 100 as an example image processing apparatus includes an operation panel 15. It is noted that the image processing apparatus may be any device on which an image of each page is input in real time while images of a plurality of pages are read and which displays a preview image of each page in real time, such as a mobile phone, a tablet-type terminal device, and a small-size computer, for example. The image processing apparatus may be any other device, such as a printer, a facsimile machine, or a copying machine. MFP 100 is an image processing apparatus including these functions in combination.

<Hardware Configuration>

Figure 2:
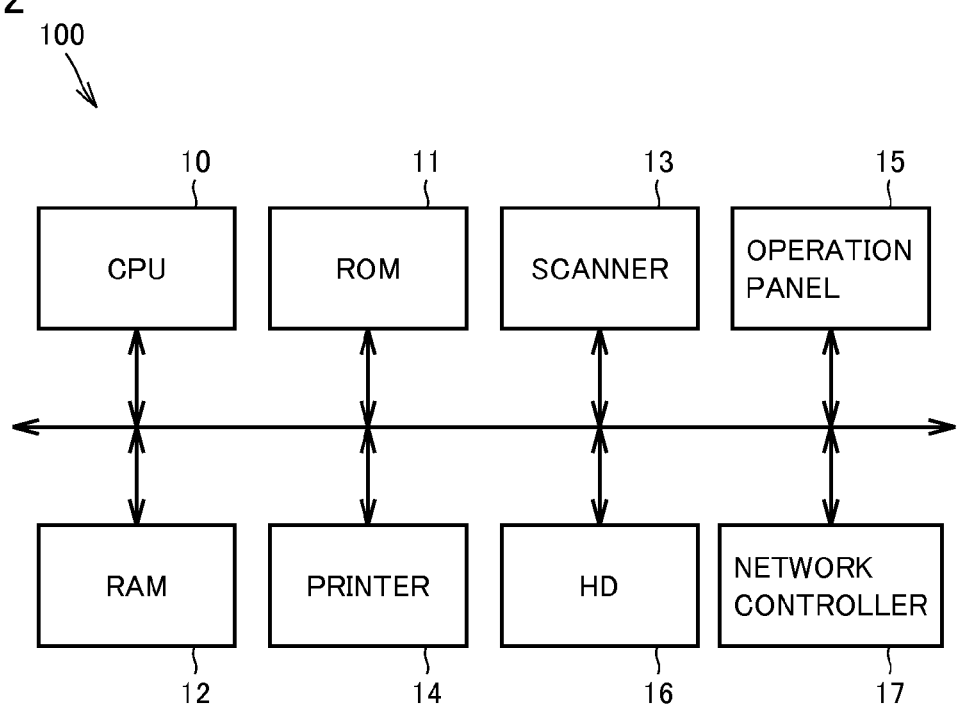
FIG. 2 is a diagram showing a specific example hardware configuration of MFP included in an image processing system.

FIG. 2 is a diagram showing a specific example hardware configuration of MFP 100. As shown in FIG. 2, MFP 100 includes a CPU (Central Processing Unit) 10 as operational equipment for overall control.

MFP 100 further includes a ROM (Read Only Memory) 11 for storing programs and the like to be executed by CPU 10, a RAM (Random Access Memory) 12 for functioning as a workspace during execution of a program by CPU 10, a scanner 13 for optically reading a document placed on a document table not shown to obtain image data thereof, a printer 14 for fixing image data on printing paper, operation panel 15 including a touch panel for displaying information thereon, receiving an operational input made on MFP 100 and the like, a HD (hard disk) 16 for storing image data and the like, and a network controller 17 for controlling communications through a network.

Programs executed by CPU 10 may be stored in a storage device on a network rather than in ROM 11, or may be downloaded from the network and installed in HD 16, or may be stored in a recording medium which is removable from MFP 100.

<Functional Configuration>

Figure 3:
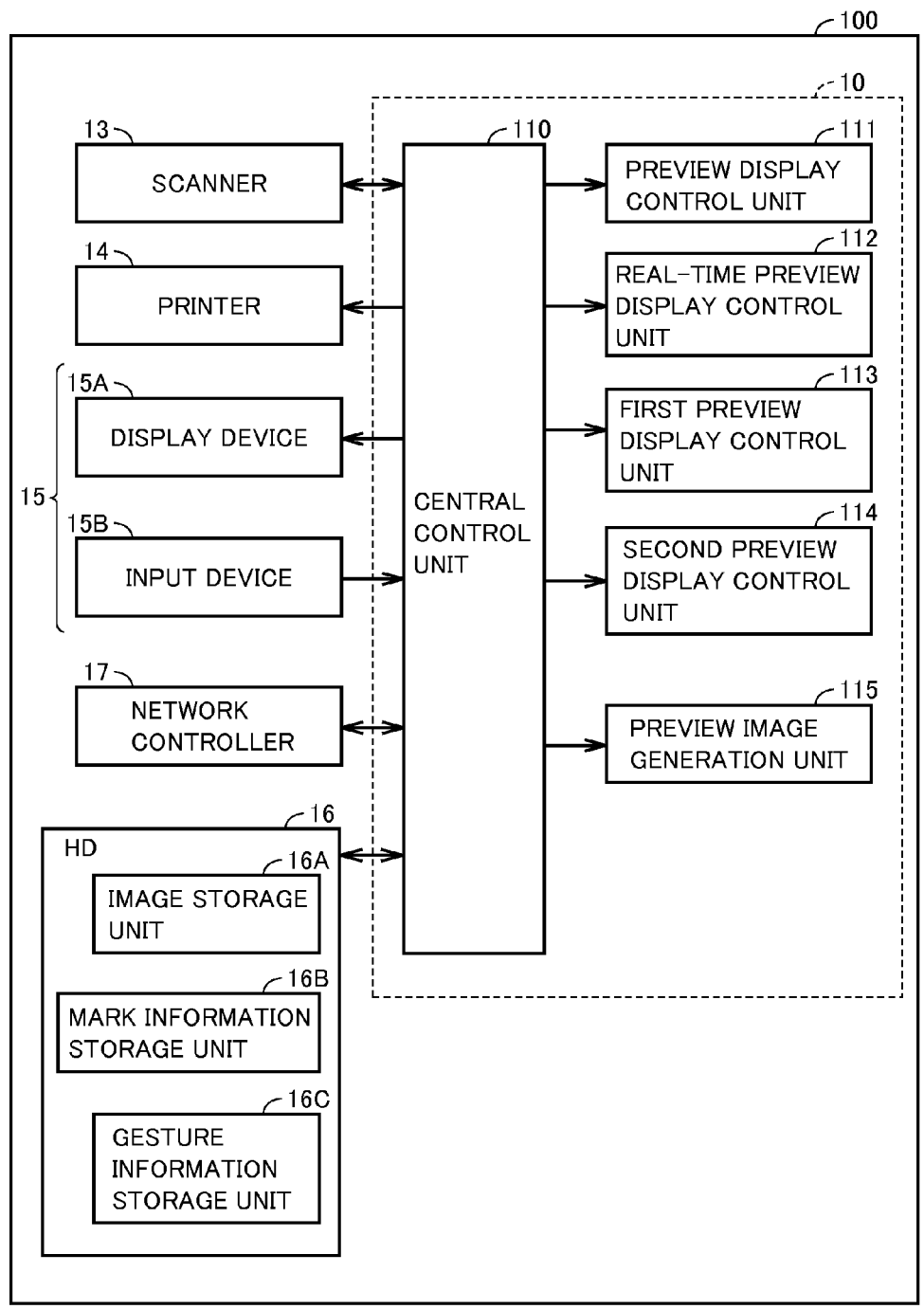
FIG. 3 is a diagram showing a specific example functional configuration of MFP.

FIG. 3 is a diagram showing a specific example functional configuration of MFP 100. As shown in FIG. 3, MFP 100 includes, as a function of CPU 10, a central control unit 110, a preview display control unit 111, a real-time preview display control unit 112, a first preview display control unit 113, a second preview display control unit 114, and a preview image generation unit 115. Central control unit 110 controls operations (operation timing, etc.) of other functions of CPU 10. Operation panel 15 includes a display device 15A and an input device 15B. Display device 15A may be implemented by any display device including a liquid crystal display. Input device 15B may be implemented by any input device, such as a touch sensor. Input device 15B can be implemented by an input device that may be configured integrally with the display device, such as a touch sensor, or may be implemented by an input device that may be configured separately from the display device. HD 16 includes an image storage unit 16A, a mark information storage unit 16B, and a gesture information storage unit 16C.

CPU 10 causes display device 15A to display an operation screen based on previously stored data for making a screen display. Input device 15B receives input of an instruction. In the case where input device 15B includes a touch sensor, input device 15B specifies the position where an instruction has been input with the touch sensor, and inputs a manipulate signal indicative of that position to CPU 10. In the case where input device 15B includes one or more keys, input device 15B inputs a manipulate signal indicative of a pressed key to CPU 10. CPU 10 executes processing based on the details of input. It is noted that CPU 10 may specify the details of an input instruction based on the position of an input instruction or the type of key.

Preview display control unit 111 controls a preview display in MFP 100. In MFP 100, four types of preview displays: a real-time preview display; a normal preview display; a first preview display; and a second preview display may be executed as will be described later. Among them, preview display control unit 111 executes processing for achieving the normal preview display. Preview display control unit 111 also executes processing of switching between the first preview display and the second preview display.

Real-time preview display control unit 112 controls the real-time preview display. More specifically, while scanner 13 is reading a document including one or more pages, preview images (thumbnail images) generated for image information on the respective pages of the document are sequentially displayed on display device 15A.

First preview display control unit 113 executes display control for achieving the first preview display. The first preview display is a display mode of displaying, after the real-time preview, only a thumbnail image of image information for which a mark instruction has been input on the preview screen in the real-time preview of sequentially displaying image information on the respective pages of the document.

Second preview display control unit 114 executes display control for achieving the second preview display. The second preview display is a display mode of displaying, after the real-time preview, a thumbnail image of image information for which a mark instruction has been input in the real-time preview and a thumbnail image of image information for which a mark instruction has not been input, in different manners.

For the real-time preview display, a thumbnail image of each piece of image information is used. Preview image generation unit 115 generates image information on the respective pages of the document obtained with scanner 13, and further generates thumbnail images of that image information. Preview image generation unit 115 stores the image information and thumbnail images of the respective pages in image storage unit 16A.

The first preview display and the second preview display require information that specifies a mark instruction having been input in the real-time preview. When a mark instruction is input during the real-time preview, real-time preview display control unit 112 stores in mark information storage unit 16B information indicating that the mark instruction has been made for a thumbnail image (image information) subjected to the mark instruction. When a mark instruction is made, real-time preview display control unit 112, for example, specifies the position where the mark instruction has been made on input device 15B, and specifies the position in display device 15A corresponding to that specified position, and specifies a thumbnail image (image information) displayed at that position in display device 15A, thereby specifying a thumbnail image (image information) corresponding to the mark instruction.

In the case where a mark instruction includes a gesture, real-time preview display control unit 112 may store in mark information storage unit 16B the details of an instruction corresponding to that gesture (e.g., "select", "delete", "scale-up"/"scale-down", "specification of group", or "rotate").

More specifically, gesture information storage unit 16C stores the details of a gesture (the details of an operation on input device 15B) in association with the details of an instruction. For example, in gesture information storage unit 16C, the details of an instruction to "select" image information is associated with the details of an operation called a single tap. The details of an instruction to "delete" image information is associated with the details of an operation called a flick operation. The details of an instruction to "scale-down" image information is associated with the details of an operation called a pinch-in. The details of an instruction to "scale-up" image information is associated with the details of an operation called a pinch-out. The details of an instruction to "rotate" image information is associated with the details of an operation of drawing a semicircular line. The details of an instruction to perform grouping in accordance with the number of times are associated with the details of an operation of two or more continuous touch operations. The word "continuous" means that a subsequent touch operation is executed before a certain time period has elapsed since a previous touch operation. For example, in the case where three continuous touch operations have been performed for a mark instruction, it means that an instruction to assign a group "3" has been made on image information subjected to the mark instruction.

<Preview Display>

Next, processing for a preview display when image information on a document is obtained in MFP 100 will be described. The preview display refers to displaying image information which may be subjected to processing, such as printing, in MFP 100. It is noted that, in MFP 100, an image to be subjected to the preview display is not limited to an image having been read with scanner 13. An image having been read with another device (e.g., a scanner device external to MFP 100) may be subjected to the preview display. In MFP 100, the preview display may be included in image forming processing, such as printing processing.

Figure 4:
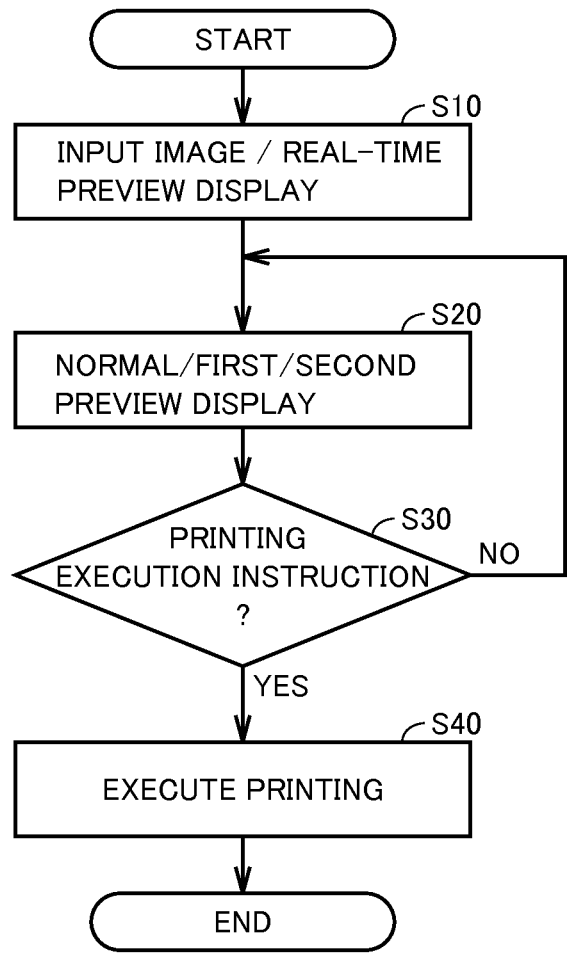
FIG. 4 is a flow chart of printing processing including a preview display executed in MFP.
Figure 5:
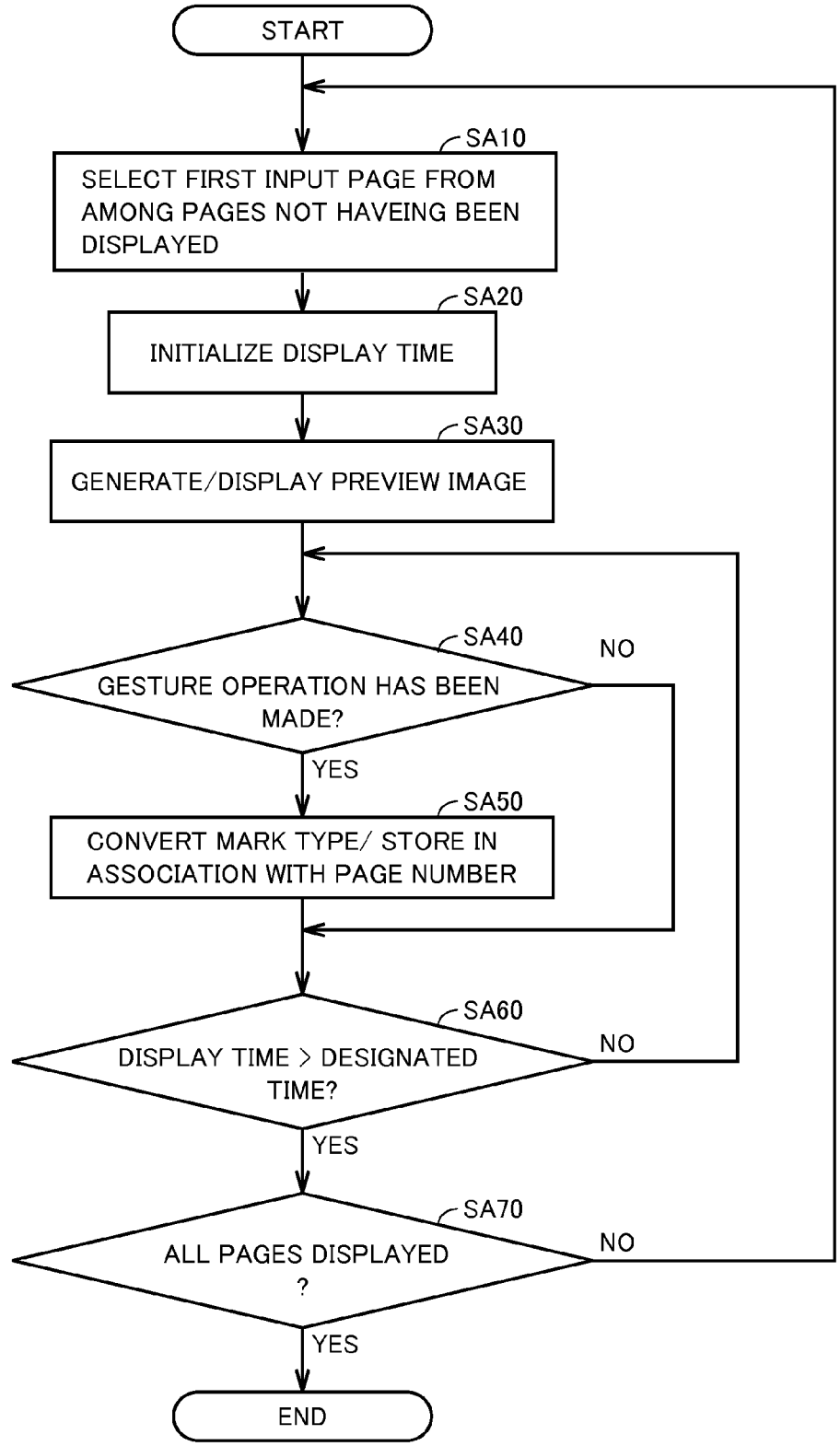
FIG. 5 is a flow chart of a subroutine of FIG. 4.
Figure 6:
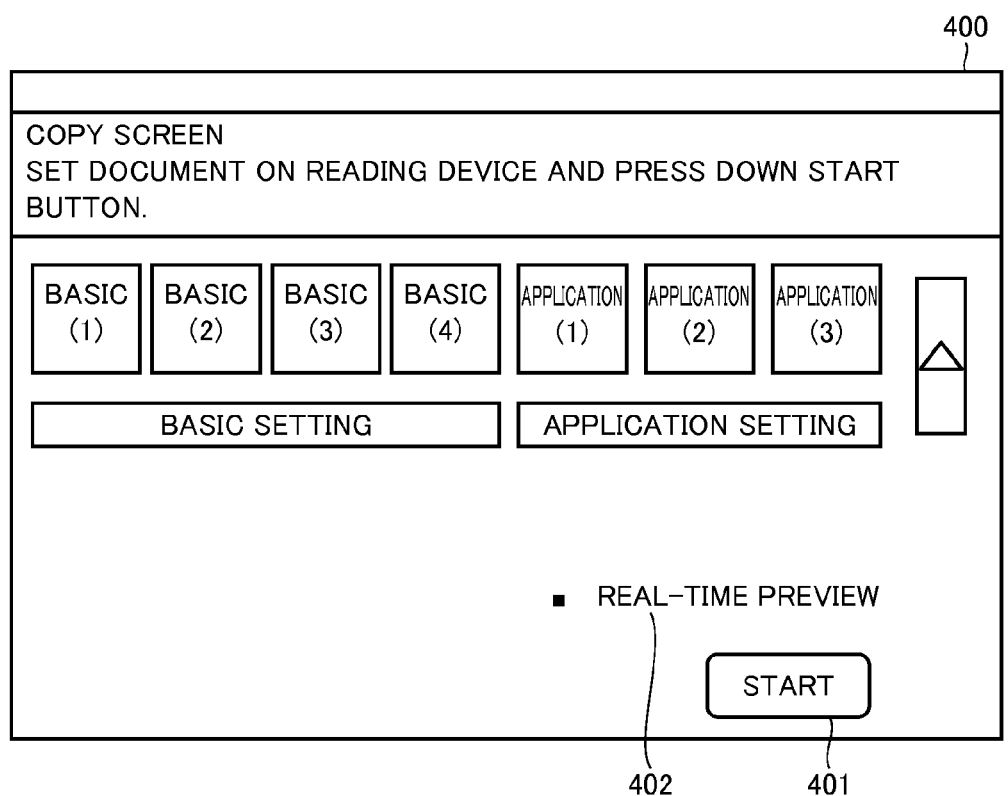
FIGS. 6 and 7 are diagrams showing example screen images displayed on a display device.
Figure 7:
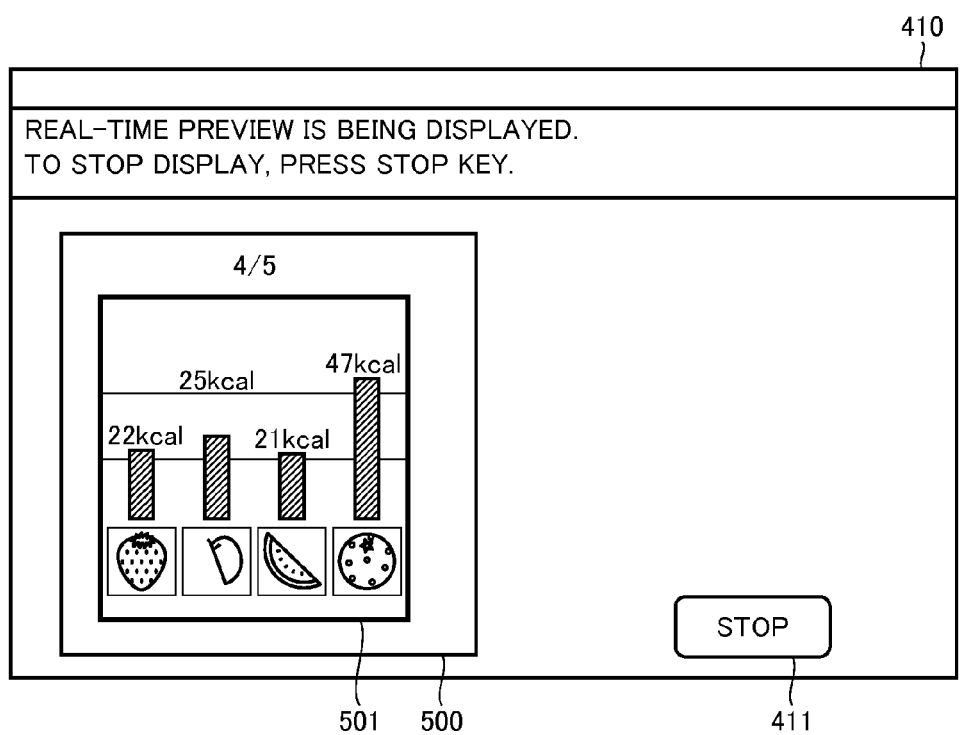

Referring to FIGS. 4 to 11, printing processing including the preview display will be described as an example description of the preview display. FIG. 4 is a flow chart of printing processing including the preview display executed in MFP 100. FIG. 5 is a flow chart of a subroutine of FIG. 4. FIGS. 6 and 7 are diagrams showing example screen images displayed on display device 15A. Each of FIGS. 8 to 11 is a diagram for illustrating input of a mark instruction.

The process in the flow chart of FIG. 4 is started when printing is instructed on MFP 100, for example. The instruction for printing may differ from a printing execution instruction which will be described later. The instruction for printing is input to MFP 100 by a user placing a document at a document reading position in MFP 100 or the like and operating a start button.

First, referring to FIG. 4, in step S10, CPU 10 receives input of image information from scanner 13 and executes the real-time preview display. Then, the control is advanced to step S20.

Before the start of input of image information with scanner 13, a screen 400 as shown in FIG. 6 is displayed on display device 15A. Text 402 is displayed on screen 400 with various software buttons. Text 402 shows a character string of "real-time preview", indicating that the setting for executing the real-time preview when MFP 100 obtains image information has been made. A button 401 is a start button. When that button is operated, acquisition of image information with scanner 13 is started in MFP 100.

In MFP 100, the real-time preview display is executed in parallel to the acquisition of image information. FIG. 7 shows the state where display device 15A is making the real-time preview display. A screen 410 of FIG. 7 includes a frame 500. In frame 500, a thumbnail image of one page in a document whose image information is being read is displayed as an image 501. Screen 410 includes a button 411. When a user operates button 411, CPU 10 stops the acquisition of image information with scanner 13. The real-time preview display includes generation of a thumbnail image of each page and display of that thumbnail image, for example. In the real-time preview display, thumbnail images of the respective pages included in the document are sequentially displayed. Each thumbnail image is displayed for a given time (e.g., 1 second).

Frame 500 includes a description of "4/5". In that description, the first number "4" indicates the page to which image 501 corresponds, and the last number "5" indicates the number of pages having already been read.

Referring back to FIG. 4, in step S20, CPU 10 performs the normal preview display, the first preview display and/or the second preview display, and advances the control to step S30. The mode of execution of these three preview displays will be described later with reference to FIG. 16 and the like.

In step S30, CPU 10 determines whether or not a printing execution instruction has been input. The printing execution instruction is input by an operation on input device 15B, for example. When it is determined that the printing execution instruction has been input, CPU 10 advances the control to step S40. When it is determined that the printing execution instruction has not been input, CPU 10 returns the control to step S20.

In step S40, CPU 10 causes printer 14 to print a document subjected to processing, and terminates the control. At this time, CPU 10 may eliminate information that specifies the association between image information and the mark type stored in mark information storage unit 16B.

<Real-Time Preview Display>

FIG. 5 shows a flow chart of a subroutine of processing for the real-time preview display in the processing of step S10 of FIG. 4. Referring to FIG. 5, the details of processing in the real-time preview display will be described in detail.

Referring to FIG. 5, in step SA10, among pages whose image information has been input with scanner 13, CPU 10 designates a page that is not yet displayed in step SA30 which will be described later and that has been input first as a target of processing, and advances the control to step SA20. It is noted that, in step SA10, if there is no page as described above, CPU 10 waits for input of image information of such a page in step SA10. If the last page of the document has already been subjected to processing of and subsequent to step SA20, CPU 10 returns the control to FIG. 4. If there is no input of new image information for a given time (e.g., for 5 seconds) or longer, for example, CPU 10 returns the control to FIG. 4.

In step SA20, CPU 10 initializes the display time, and advances the control to step SA30. More specifically, in step SA20, CPU 10 causes a timer which measures a time period for displaying each preview image in the real-time preview display to start timing.

In step SA30, CPU 10 generates a preview image (thumbnail image) of the page subjected to processing, causes that image to be displayed, and advances the control to step SA40. Accordingly, the preview image (thumbnail image) of the page subjected to processing is displayed on display device 15A as described with reference to FIG. 7.

In step SA40, CPU 10 determines whether or not a gesture operation has been made on the preview image displayed in step SA30. For example, CPU 10 determines that a gesture operation has been made on the preview image in the case where the details of an operation made on input device 15B while the preview image is being displayed match the details of an operation stored in gesture information storage unit 16C. If it is determined that a gesture operation has been made, the control is advanced to step SA50. If it is determined that a gesture operation has not been made, the control is advanced to step SA60.

Figure 8:
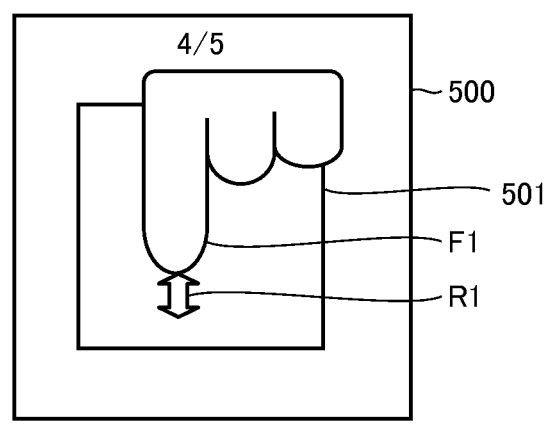
FIG. 8 is a diagram showing details of an operation called a single tap.

Referring to FIGS. 8 to 11, specific example gesture operations will be described. FIG. 8 shows the state where a user's finger F1 touches once a region where image 501 is displayed on input device 15B. An arrow R1 indicates the moving direction of finger F1.

Figure 9:
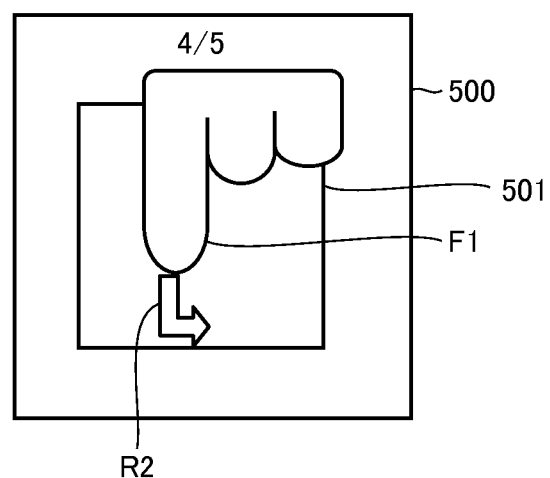
FIG. 9 is a diagram showing details of an operation called a flick operation.

FIG. 9 shows the details of an operation called a flick operation. FIG. 9 shows the state where user's finger F1 is slidingly moving in a region on input device 15B where image 501 is displayed. An arrow R2 indicates the moving direction of finger F1.

Figure 10:
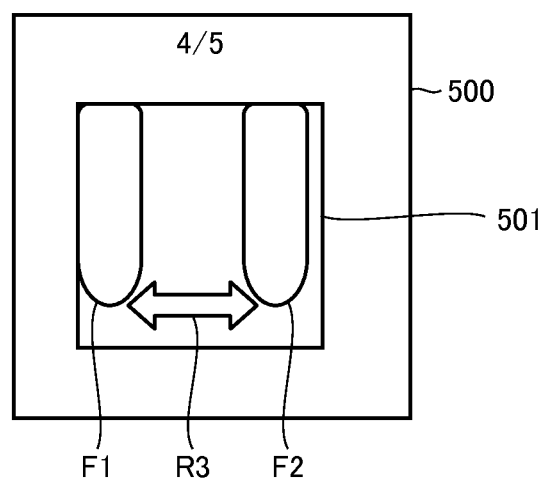
FIG. 10 is a diagram showing details of an operation called a pinch-out.

FIG. 10 shows the details of an operation called a pinch-out. FIG. 10 shows the state where user's two fingers F1 and F2 are moving away from each other so as to increase the space therebetween in a region on input device 15B where image 501 is displayed. An arrow R3 indicates the moving directions of fingers F1 and F2. It is noted that an operation called a pinch-in is an operation of moving user's two fingers closer to each other so as to decrease the space therebetween in the above-mentioned region.

Figure 11:
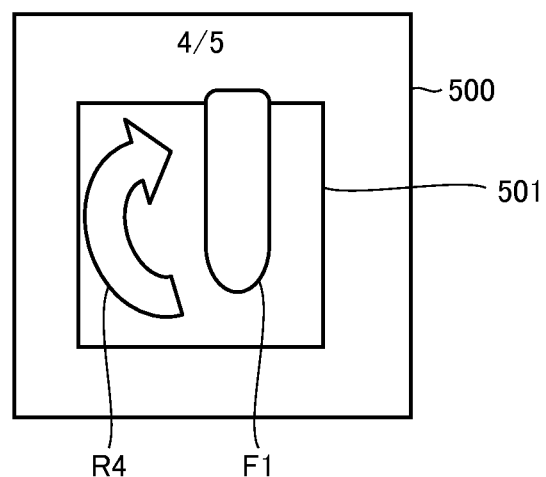
FIG. 11 is a diagram showing details of an operation of drawing a semicircular line.

FIG. 11 shows the details of an operation of drawing a semicircular line. FIG. 11 shows the state where user's finger F1 is moving along an arrow R4 so as to draw a semicircle in the region on input device 15B where image 501 is displayed.

In step SA50, CPU 10 converts the details of an operation specified as a gesture operation into a type of mark instruction, associates that type of mark instruction with image information subjected to processing for storage in mark information storage unit 16B, and advances the control to step SA60. The conversion from the details of an operation into the type of mark instruction is carried out based on the association in gesture information storage unit 16C, for example.

In step SA60, CPU 10 determines whether or not the display time of a preview image of image information subjected to processing has passed a designated time (e.g., 1 second). The determination in step SA60 is made based on whether or not the time measured by the above-mentioned timer has passed the designated time, for example. If it is determined that the above-mentioned display time has passed the designated time, CPU 10 advances the control to step SA70. If it is determined that the designated time has not yet elapsed, CPU 10 returns the control to step SA40.

In step SA70, CPU 10 determines whether or not all the pages of the document have been subjected to the processing through steps SA20 to SA60. If it is determined that there is a page not having been subjected to the processing, CPU 10 returns the control to step SA10. If it is determined that all the pages have been subjected to the processing, CPU 10 returns the control to FIG. 4.

<Preview Display>

Referring to FIGS. 12 to 16, the preview display in step S20 of FIG. 4 will be described. In MFP 100, when input of image information of all the pages of the document has been completed, one or more types of preview displays among three types of preview displays (the normal preview display, the first preview display, and the second preview display) are executed. In connection with the preview display, MFP 100 receives setting of printing conditions for image information being previewed. The above-described three types of preview displays and setting of printing conditions will be described below.

(Normal Preview Display)

Figure 12:
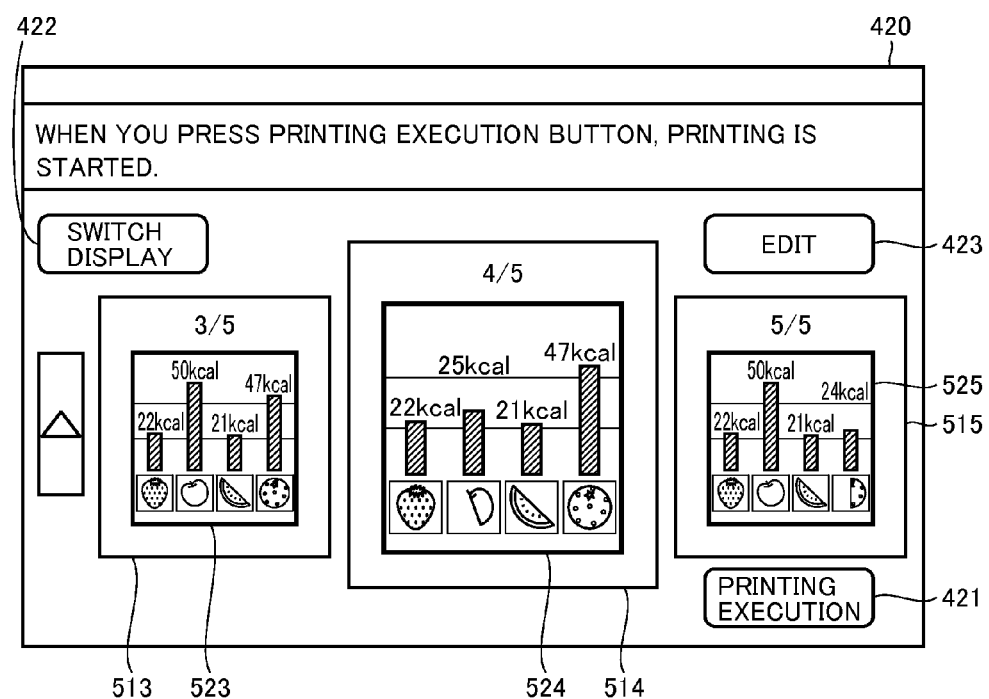
FIG. 12 is a diagram for illustrating a normal preview display on a display device.

FIG. 12 is a diagram for illustrating the normal preview display on display device 15A. In the normal preview display, preview images corresponding to image information on all the pages having been input for the document subjected to processing are subjected to display. It is noted that, among the preview images subjected to display, preview images corresponding to three pieces of image information continuously input are simultaneously displayed on display device 15A. The preview images displayed on display device 15A are changed as appropriate by operating input device 15B, for example.

A screen 420 shown in FIG. 12 includes three buttons 421 to 423, three frames 513 to 515, and three images 523 to 525 displayed in frames 513 to 515, respectively.

Button 421 is for instructing execution of printing mentioned in step S30 of FIG. 4. When button 421 is operated, the control is advanced from step S30 to step S40. A button 422 is for switching the display on display device 15A to the first preview display or the second preview display. A button 423 is for setting the printing conditions for image information corresponding to a preview image being displayed on screen 420 as a selected object. When button 423 is displayed, a screen 450 shown in FIG. 15 for setting the printing conditions, which will be described later, is displayed on display device 15A.

It is noted that in the preview display, when only one preview image is displayed, that preview image is a selected object. In the case where two or more preview images are displayed in the preview display, a preview image being displayed in a manner more noticeable than the remaining preview image(s) (e.g., larger than the remaining preview image(s)) is the selected object.

Three images 523 to 525 are preview images whose image information has been input continuously in the document. The descriptions in frames 513 to 515, such as "3/5", each indicate the number of pages of the document and the page number of an image in the frame. More specifically, the description "3/5" in frame 513 indicates that image 523 in frame 513 is a preview image of the page 3 of a 5-page document. The description "4/5" in frame 514 indicates that image 524 in frame 514 is a preview image of the page 4 of the 5-page document. The description "5/5" in frame 515 indicates that image 525 in frame 515 is a preview image of the page 5 of the 5-page document.

(First Preview Display)

Figure 13:
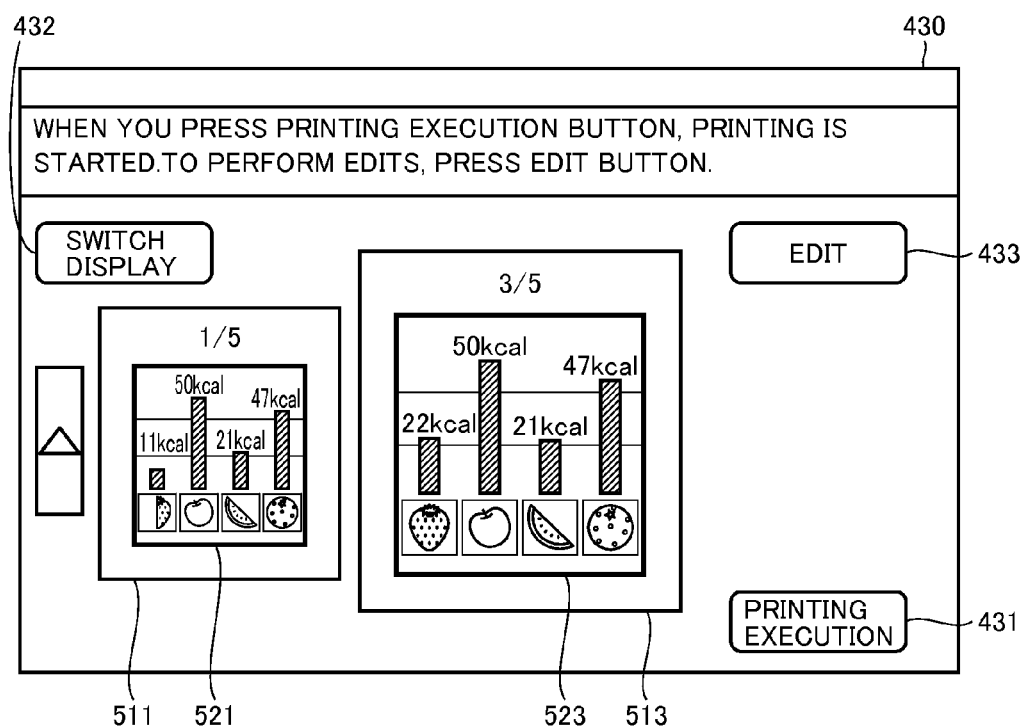
FIG. 13 is a diagram for illustrating a first preview display on a display device.

FIG. 13 is a diagram for illustrating the first preview display on display device 15A. In the first preview display, a preview image corresponding to a page for which a mark instruction has been input among pages of a document subjected to processing whose image information has been input is subjected to display.

A screen 430 shown in FIG. 13 includes three buttons 431 to 433, two frames 511 and 513, and two images 521 and 523 displayed in frames 511 and 513, respectively. Images 521 and 523 are preview images of pages for which mark instructions have been input in the real-time preview display (step S10 of FIG. 4 and FIG. 5). Each description in frames 511 and 513, such as "1/5", indicates the page number to which the image in each frame corresponds and the number of pages of the document, similarly to the corresponding descriptions in FIG. 12.

Button 431 is for instructing execution of printing mentioned in step S30 of FIG. 4. When button 431 is operated, the control is advanced from step S30 to step S40. Button 432 is for switching the display on display device 15A to the normal preview display or the second preview display. Button 433 is for setting the printing conditions for image information corresponding to a preview image being displayed on screen 430 as a selected object. When button 433 is displayed, screen 450 of FIG. 15 for setting the printing conditions, which will be described later, is displayed on display device 15A.

(Second Preview Display)

Figure 14:
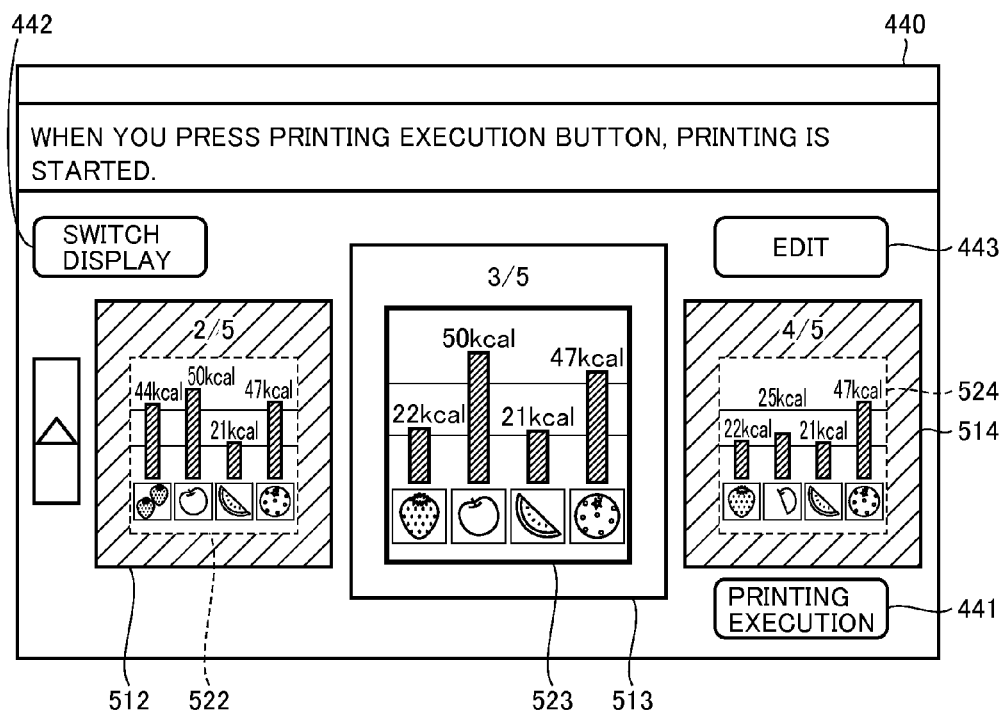
FIG. 14 is a diagram for illustrating a second preview display on a display device.

FIG. 14 is a diagram for illustrating the second preview display on display device 15A. The second preview display displays a preview image corresponding to a page for which a mark instruction has been input among the pages of a document subjected to processing whose image information has been input, in a different manner from the remaining preview images.

A screen 440 shown in FIG. 14 includes three buttons 441 to 443, three frames 512 to 514, and three images 522 to 524 displayed in frames 512 to 514, respectively. Among images 522 to 524 of FIG. 14, image 523 is a preview image of a page for which a mark instruction has been input in the real-time preview display (step S10 of FIG. 4 and FIG. 5). Images 522 and 524 are preview images of pages for which mark instructions have not been input. Based on this, image 523 is displayed on screen 440 in a different manner from images 522 and 524. In FIG. 14, frame 513 is displayed by a color different from those of frames 512 and 514. In FIG. 14, image 523 is displayed in the normal manner, and images 522 and 524 are grayed out (displayed in a manner less noticeable than image 523). The descriptions in frames 512 to 514, such as "2/5", each indicate the page number to which the image in each frame corresponds and the number of pages of the document, similarly to the corresponding descriptions in FIG. 12.

Button 441 is for instructing execution of printing mentioned in step S30 of FIG. 4. When button 441 is operated, the control is advanced from step S30 to step S40. Button 442 is for switching the display on display device 15A to the normal preview display or the first preview display. Button 443 is for setting the printing conditions for image information corresponding to a preview image being displayed on screen 440 as a selected object. When button 443 is displayed, screen 450 shown in FIG. 15 for setting the printing conditions, which will be described later, is displayed on display device 15A.

(Screen for Setting Printing Conditions)

Figure 15:
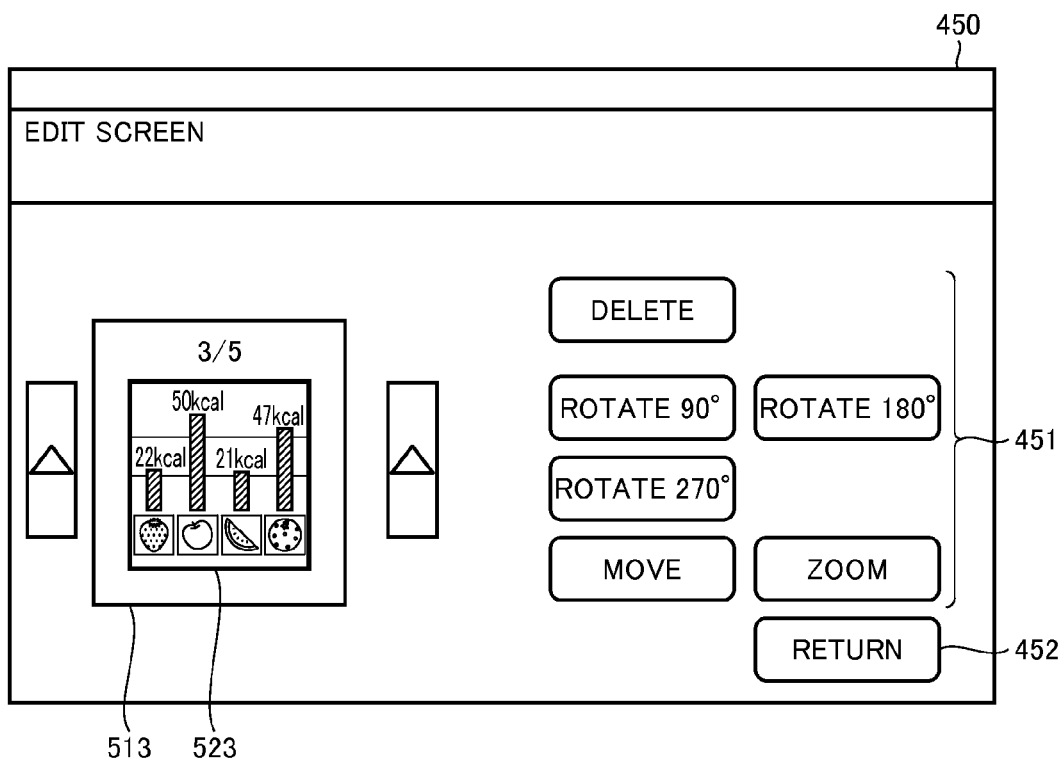
FIG. 15 is a diagram showing an example screen image for setting printing conditions.

FIG. 15 is a diagram showing an example screen image for setting printing conditions displayed by operation of buttons 423, 433 and 443. Screen 450 shown in FIG. 15 includes frame 513, image 523 displayed in frame 513, a setting button group 451, and a button 452. On screen 450, image 523 is a thumbnail image of image information for which printing conditions are to be set. When a user operates setting button group 451, printing conditions are set for the target image information in accordance with that operation. Button 452 is operated for returning the screen displayed on display device 15A to a screen displayed immediately before.

As described with reference to FIG. 5, in MFP 100, when a gesture operation is made in step SA40, the type of mark instruction corresponding to that gesture operation is stored in mark information storage unit 16B. CPU 10 can change, add or delete the stored type (cancel the mark instruction) based on the operation on setting button group 451. For example, for the image information with the type "select" given thereon by making a single tap operation in step SA40, CPU 10 can add a type such as "delete" or "rotate" based on the operation on setting button group 451. For the type "rotate", the rotational angle is also selected.

<Switching of Screen in Preview Display>

Figure 16:
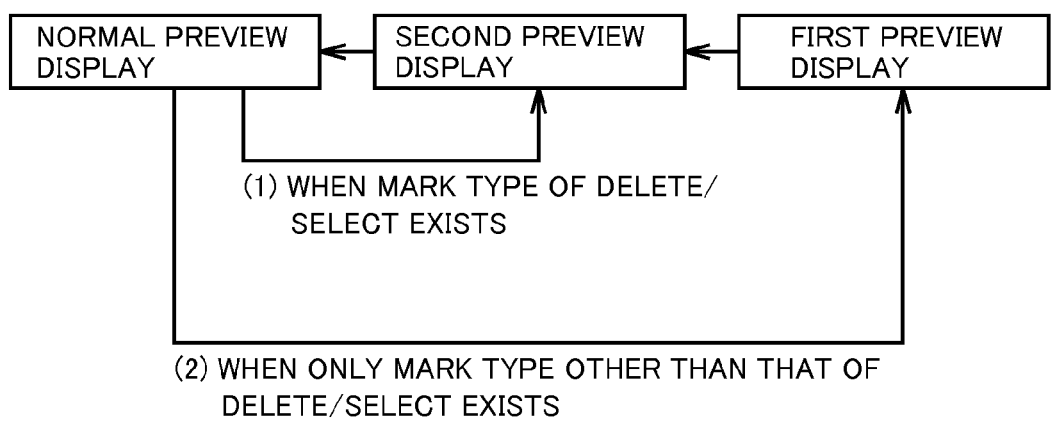
FIG. 16 is a diagram for illustrating the mode of switching the screen.

As described above, during the preview display in step S20 of FIG. 4, the user can switch the displayed image among the normal preview display, the first preview display and the second preview display by operating input device 15B as appropriate. FIG. 16 is a diagram for illustrating the mode of switching the screen.

FIG. 16 shows switching of the display among the normal preview display, the first preview display and the second preview display by arrows. In the preview display in step S20, the normal preview display is executed.

Thereafter, when the condition (1) is met, in the preview display, the display is switched only between the normal preview display and the second preview display. The condition (1) indicates that the type stored in mark information storage unit 16B by a mark instruction includes at least one of "delete" and "select." In this case, the first preview display of displaying only the preview image with the mark instruction given thereon is not selected as a display mode in the preview display. Accordingly, the preview image for which the type such as "delete" or "select" has been designated as a mark instruction is certainly displayed together with the remaining preview images, which can secure the user to determine whether or not the designation of the type should be maintained.

When the condition (2) is met, the display is switched in the order of the normal preview display, the first preview display and the second preview display. The condition (2) indicates that the type stored in mark information storage unit 16B by a mark instruction includes neither "delete" nor "select."

<Summary of Embodiment>

According to the present embodiment described above, image information on each page is input to MFP 100 as an image of a document. In the preview display after the real-time preview display, a preview image of image information with a mark instruction given thereon during the real-time preview display is displayed in a manner different from the remaining pieces of image information in the document. The different manner is such that, for example, a preview image with a mark instruction given thereon is separately displayed as the first preview display while the remaining preview images are displayed in the preview display, or may be displayed in a different manner on the same screen as in the second preview display.

Accordingly, even if the user has intended but failed to perform the gesture of drawing a semicircle shown in FIG. 11 on a certain preview image in the real-time preview display, for example, he/she at least only needs to make a single tap shown in FIG. 8. That preview image is displayed on the second preview display. Accordingly, the user can newly set printing conditions on the second preview display in the preview display after the real-time preview. In the second preview display, a preview image with a mark instruction given thereon is displayed in a manner different from preview images with no mark instruction given thereon. Accordingly, the user can easily review the preview image with the mark instruction given thereon.

<Variation (1)>

In the present embodiment, when the condition (1) is met, the first preview display is not performed. However, this is an example of the embodiment. Even if the condition (1) is met, the first preview display may be performed.

<Variation (2)>

In the first preview display and the second preview display, preview images with mark instructions given thereon are displayed uniformly irrespective of the type of mark instruction. According to the variation (2), in the first and/or second preview display, preview images with mark instructions given thereon are displayed in different groups in accordance with the type of mark instruction, as shown in FIG. 17.

Figure 17:
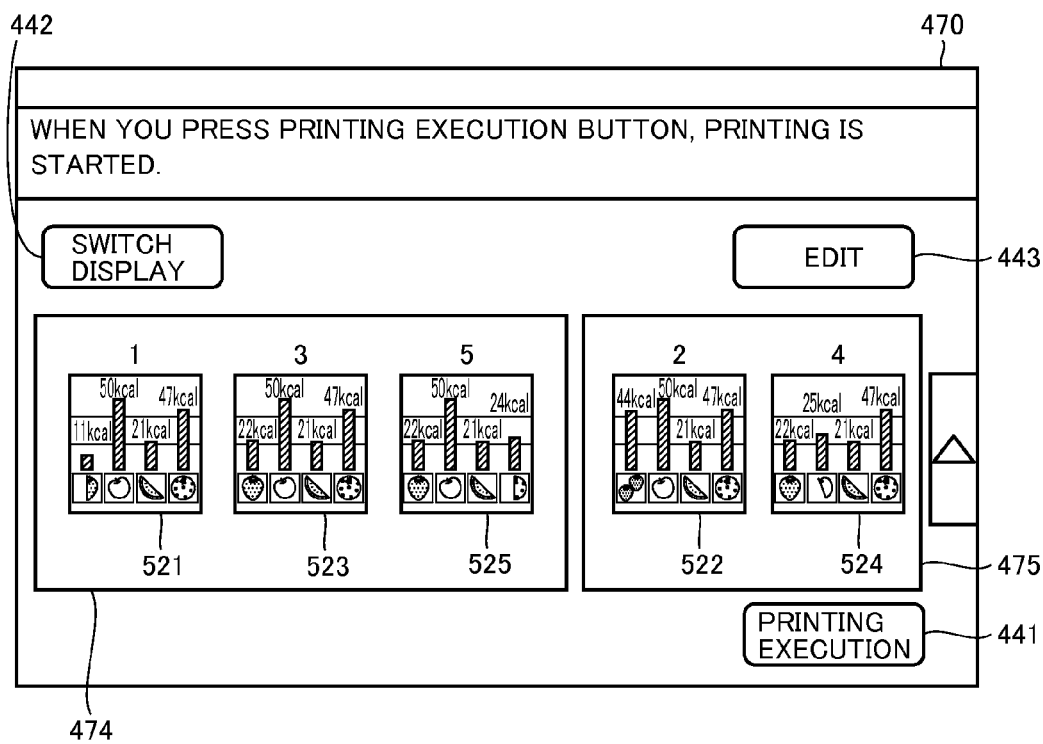
FIG. 17 is a diagram for illustrating a variation (2).

On screen 460 of FIG. 17, five images 521 to 525 are displayed as preview images with mark instructions given thereon. Among them, images 521, 523 and 525 are displayed in a frame 464 as a first group. Images 522 and 524 are displayed in a frame 465 as a second group.

<Variation (3)>

Figure 18:
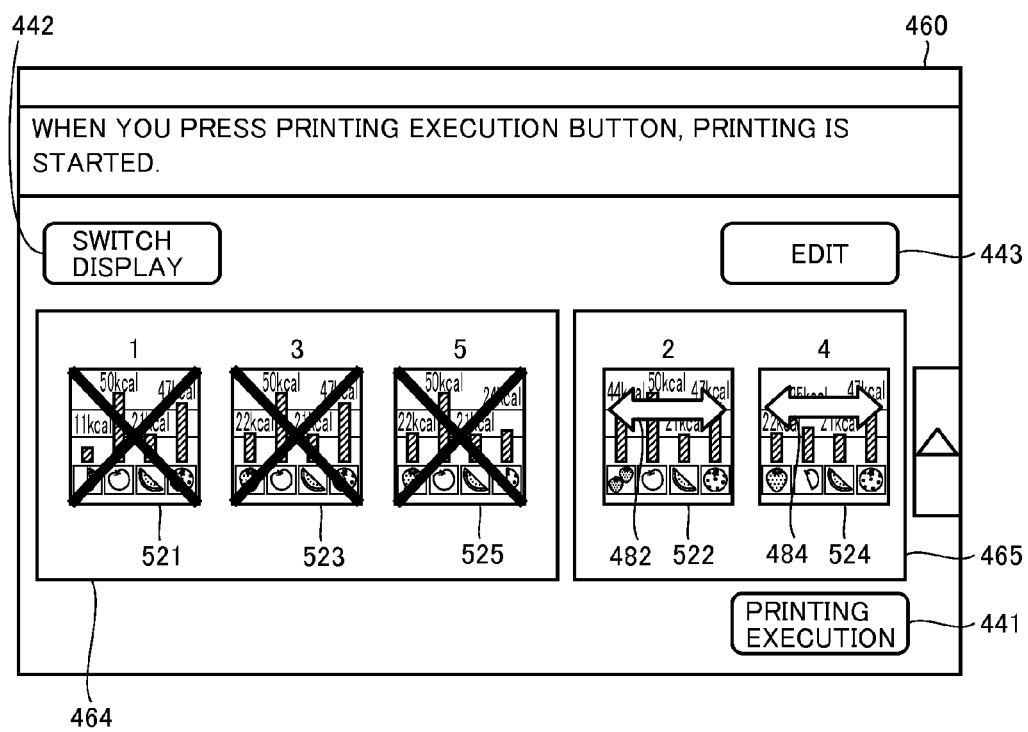
FIG. 18 is a diagram for illustrating a variation (3).

According to the variation (3), in the first and/or second preview display, preview images for which mark instructions have been given are displayed in groups in accordance with the type of mark instruction and further, in a manner that the details of each group are understandable, as shown in FIG. 18.

On screen 470 of FIG. 18, five images 521 to 525 are displayed as preview images for which mark instructions have been given. Among them, images 521, 523 and 525 are displayed in a frame 474 as the first group with two thick lines indicating the type "delete" given thereon, respectively. Images 522 and 524 are displayed in a frame 475 as the second group with arrows 482 and 484 indicating the type "scale-up" given thereon, respectively.

<Variation (4)>

In the preview display after the real-time preview, a preview image of image information with a mark instruction given thereon may be displayed in a state having been subjected to processing corresponding to the type of mark instruction. For example, a preview image of image information with the mark instruction "rotate" given thereon may be displayed as rotated by a designated angle in the preview display after the real-time preview.

When the type of mark instruction is stored in mark information storage unit 16B in the processing for the real-time preview display (FIG. 5), preview image generation unit 115 may perform image processing corresponding to that type on the preview image stored in image storage unit 16A. In this case, the image processing on the preview image will be performed in parallel to the real-time preview display.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image processing apparatus comprising:
   an image reader configured to read a plurality of images, wherein the images correspond to pages of a job;
   a preview image generator configured to, based on image information of the plurality of images input with said image reader, generate a plurality of preview images of the image information, each preview image corresponding to a page of the job;
   a real-time preview controller configured to separately display each preview image of said plurality of preview images in real-time as said image information of said job is input by said image reader;
   an input device configured to receive input of information;
   a specific information storage unit configured to, upon receiving a predetermined operation on said preview image during execution of said real-time preview, store information that specifies said preview image for which the predetermined operation has been received; and
   a first preview controller configured to execute a first preview display of displaying only those preview images for which said predetermined operation has been received, wherein the first preview display is executed after completion of said real-time preview, based on the information stored in said specific information storage unit.

2. The image processing apparatus according to claim 1, wherein the real-time preview controller switches the first preview display for each predetermined time period measured by a timer during execution of said real-time preview.

3. The image processing apparatus according to claim 1, wherein the specific information storage unit stores the information based on a gesture made on said input device.

4. The image processing apparatus according to claim 1, further comprising a second preview controller configured to execute a second preview display of displaying said preview image for which said predetermined operation has been received and said preview image for which said predetermined operation has not been received among preview images of said job in manners different from each other after completion of said real-time preview, based on the information stored in said specific information storage unit.

5. The image processing apparatus according to claim 4, wherein
said input device receives, as said predetermined operation, at least one of instructions including deleting, rotating, scaling, and grouping on said image information, and
when said preview image for which the predetermined operation has been received is displayed, at least one of said first preview controller and said second preview controller displays said preview image for which the predetermined operation has been received in a manner corresponding to the predetermined operation input to said input unit.

6. The image processing apparatus according to claim 5, further comprising a gesture information storage unit configured to store a gesture made on said input device in association with a type of image processing,
wherein said input device receives input of a gesture as said predetermined operation for said preview image,
for said preview image for which the gesture has been input to said input device, said specific information storage unit stores the type of image processing corresponding to the gesture input to said input device, in association with the preview image, and
when said preview image for which said predetermined operation has been received is displayed, at least one of said first preview controller and said second preview controller displays said preview image for which said predetermined operation has been received in a manner corresponding to the type of image processing stored in association with the preview image.

7. The image processing apparatus according to claim 6, wherein the gesture input to said input device includes at least one of instructions including a single touch for selecting said preview image, a flick operation for deleting image information corresponding to said preview image, a pinch-in/pinch-out operation for scaling up/down image information corresponding to said preview image, a multi-touch operation for grouping by the number of touches, and an operation of inputting a semicircular line for rotating image information.

8. The image processing apparatus according to claim 4, wherein said input device receives input of an instruction for switching display between said first preview display and said second preview display.

9. The image processing apparatus according to claim 5, wherein said preview image generator executes image processing on said preview image for display in the manner corresponding to said predetermined operation, in parallel to execution of the real-time preview by said real-time preview controller.

10. The image processing apparatus according to claim 6, further comprising a preview controller configured to select a display to be executed between said first preview display and said second preview display in accordance with the type of the predetermined operation input to said input device.

11. A method for an image processing apparatus to display a preview image of image information input by an image reader reading an image based on input of information to an input device executed by a computer of said image processing apparatus, the method comprising:
reading a plurality of images, wherein the images correspond to pages of a job;
based on the image information input by said step of reading, generating a plurality of preview images of the image information, each preview image corresponding to a page of the job;
as the image information of the job is input, executing a real-time preview for making a separate preview display of each of said plurality of preview images in real-time;
when said input device receives a predetermined operation on a preview image during execution of said real-time preview, storing information that specifies said preview image for which said predetermined operation has been received; and
executing a first preview display of displaying only those preview images for which said predetermined operation has been received, wherein said first preview display is executed after completion of said real-time preview, based on the information that specifies said preview image for which said predetermined operation has been received.

12. The method according to claim 11, wherein the first preview display is switched for each predetermined time period measured by a timer during execution of said real-time preview.

13. The method according to claim 11, wherein the storing information step is performed based on a gesture made on said input device.

14. A non-transitory recording medium recorded thereon a computer-readable program for causing a computer to execute the method as defined in claim 11.

* * * * *